United States Patent [19]

Siefert

[11] Patent Number: 4,862,191
[45] Date of Patent: Aug. 29, 1989

[54] VEHICLE OPERATION RECORDER

[75] Inventor: Roland Siefert, Bad Dürrheim, Fed. Rep. of Germany

[73] Assignee: Motor Meter AG, Fed. Rep. of Germany

[21] Appl. No.: 235,819

[22] Filed: Aug. 19, 1988

Related U.S. Application Data

[63] Continuation of Ser. No. 55,165, May 28, 1987, abandoned.

[30] Foreign Application Priority Data

May 30, 1986 [DE] Fed. Rep. of Germany ....... 3618109
Aug. 8, 1986 [DE] Fed. Rep. of Germany ....... 3626892

[51] Int. Cl.⁴ .............................................. G01D 9/00
[52] U.S. Cl. ......................................... 346/18; 346/68
[58] Field of Search ................................... 346/18, 68

[56] References Cited

U.S. PATENT DOCUMENTS

| | | | |
|---|---|---|---|
| 1,514,524 | 11/1924 | Hodgkinson | 346/68 |
| 1,619,241 | 3/1927 | Cunningham | 346/68 |
| 1,910,361 | 5/1933 | Pick | 346/68 |
| 2,152,333 | 3/1939 | Spitzglass et al. | 346/68 |
| 2,204,046 | 6/1940 | Melville | 346/68 |
| 2,873,163 | 2/1959 | Panich | 346/68 |
| 2,902,332 | 9/1959 | Bauer | 346/18 |
| 3,281,856 | 10/1966 | Fiehn | 346/18 |
| 3,434,152 | 3/1969 | Vogtlin | 346/18 |
| 3,983,566 | 9/1976 | Vogtlin et al. | 346/18 |
| 4,291,313 | 9/1981 | Dold | 346/68 |

Primary Examiner—E. A. Goldberg
Assistant Examiner—Huan H. Tran
Attorney, Agent, or Firm—Kramer, Brufsky & Cifelli

[57] ABSTRACT

In a vehicle operation recorder for motor vehicles, the recording devices are permanently undetachably connected to the display devices, the diagram chart carrier is arranged in a separate compartment of the casing which is offset laterally or rearwardly in relation to the main instrument dial, and the marker pens are arranged above the diagram chart in likewise laterally offset relation to the main instrument dial and are connected to the recording devices by a rigid bridge member.

28 Claims, 9 Drawing Sheets

VEHICLE OPERATION RECORDER

This application is a continuation of application Ser. No. 055,165, filed May 28, 1987 now abandoned.

The invention relates to a vehicle operation recorder for motor vehicles comprising a casing, measuring instruments, including speedometer, mileage counters and clock, arranged in the casing, recording devices and display devices included in the measuring instruments, marker pens connected to the recording devices, at least one main instrument dial allocated to the display devices, a diagram chart carrier rotationally driven by the clock for accommodation of at least one diagram chart on which the measured values indicated by the measuring instruments are recorded by the marker pens.

The known vehicle operation recorders of this kind have a substantially cylindrical casing consisting of two casing parts, namely a main casing and a lid casing, with the lid casing being tiltably arranged on the main casing and comprising on its free front side display devices with a main instrument dial for the measuring instruments accommodated both in the main casing and in the lid casing. In particular, the lid casing contains the clock and the diagram chart carrier driven by it. To exchange a diagram chart, the lid housing must be swung downwardly from the main housing, and the actual exchanging procedure is often impeded by the lack of available space. Since the display devices arranged in the lid housing, for example, speedometer and mileage counter, are driven from the stationary main casing, flexible drive connections which involve great manufacturing expense and are susceptible to breakdown are required. Finally, the tiltable lid casing with its main instrument dial leaves practically no scope for the flexible design of a motor vehicle instrument panel since major display devices are already arranged on the front side of the tiltable lid casing.

The object underlying the invention is to so design a generic vehicle operation recorder, while eliminating the above-described disadvantages, that a tiltable lid casing is eliminated, that the diagram charts are easily and safely insertable, and that flexible design of the display devices and thus the instrument panel of a motor vehicle is possible.

The object is attained, in accordance with the invention, in that the recording devices are permanently undetachably connected to the display devices, in that the diagram chart carrier is arranged in a separate compartment of the casing which is laterally offset in relation to the main instrument dial, and in that the marker pens are arranged above the diagram chart in likewise laterally offset relation to the main instrument dial and are connected to the recording devices by a rigid bridge member.

The following description of preferred embodiments serves, in conjunction with the appended rawings, to explain the invention in further detail. In the drawings.

Figure 1:
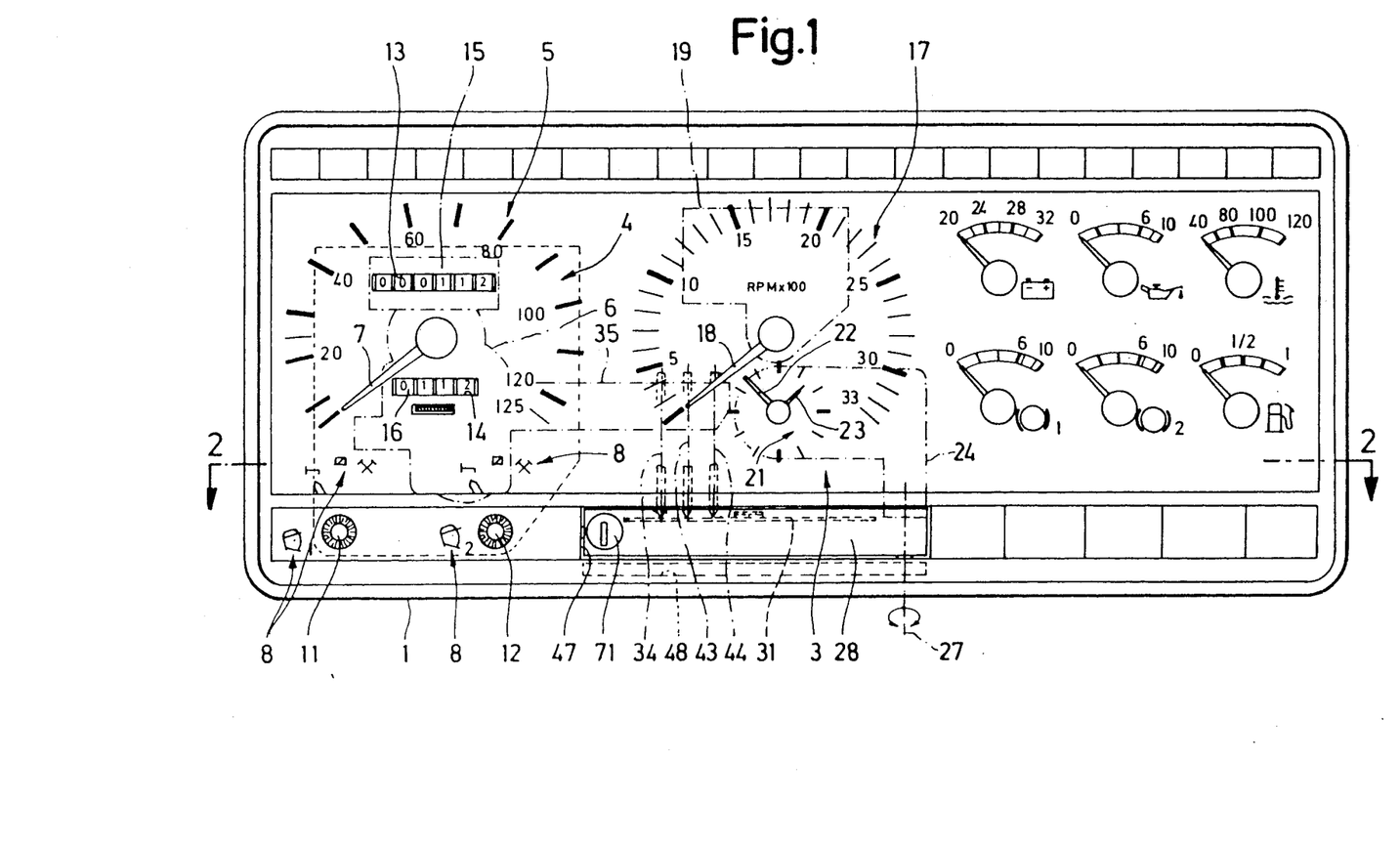
FIG. 1 is a plan view of a vehicle operation recorder.
Figure 2:
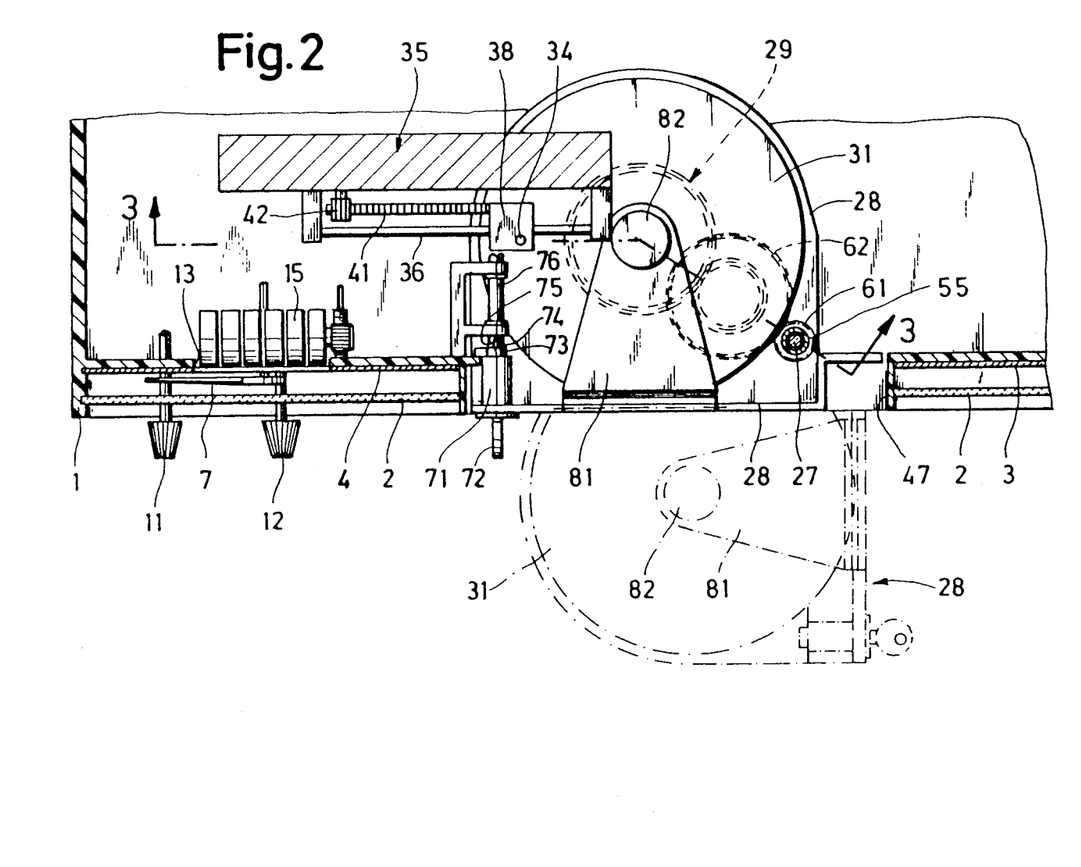
FIG. 2 is a schematic sectional view of the vehicle operation recorder taken on line 2—2 in FIG. 1.

FIG. 1 is a plan view of a vehicle operation recorder for motor vehicles with a substantially block-shaped casing 1 whose cross-sectional shape is apparent from FIG. 2. The casing 1 is covered on its front side by a transparent pane 2 made of glass or plastic. An instrument dial 3 (FIG. 2) with numerous scales over which pointers move in the conventional manner is located behind it.

The section of instrument dial 3 located on the left in FIGS. 1 and 2 is referred to hereinafter as main instrument dial 4. It comprises a speedometer scale 5 with a pointer 7 driven by a speedometer 6 associated therewith. The main instrument dial 4 further comprises symbols 8 which are associated with a time switch 11 and 12, respectively. Two drivers of a motor vehicle can alternately set their work times, rest times and the like in the conventional manner at these switches. Finally, the main instrument dial 4 comprises slots 13, 14 for display of the digits of a total mileage counter 15 and a daily mileage counter 16 in the conventional manner. These conventionally designed counters are located behind the main instrument dial and are fixedly connected to the casing 1.

Located beside the main instrument dial 4 are further areas of the instrument dial 3 likewise comprising display devices of associated measuring instruments. In particular, the center area of the instrument dial 3 contains an rpm scale 17 with pointer 18 of a revolution counter 19 accommodated in the center part of the casing 1.

Laterally offset in relation to the main instrument dial 4 is the dial 21 of a clock over which the clock hands 22, 23 are rotatable. The hands 22, 23 are driven by the clockwork of the clock which is schematically indicated in FIG. 1 and bears reference numeral 24. In contrast to conventional vehicle operation recorders, the dial 21 is located outside of the main instrument dial 4 with the speedometer scale 5. The clockwork of the clock is stationarily mounted in the casing 1.

The area of the instrument dial 3 located on the right in FIGS. 1 and 2 comprises scales with associated pointers of further measuring instruments which are likewise accommodated in the casing 1 of the vehicle operation recorder and which need not be referred to in further detail. It is, in any case, evident that the elongate, rectangular vehicle operation recorder casing 1 permits arrangement of a much larger number of measuring instruments than the cylindrical casing of conventional vehicle operation recorders.

Figure 3:
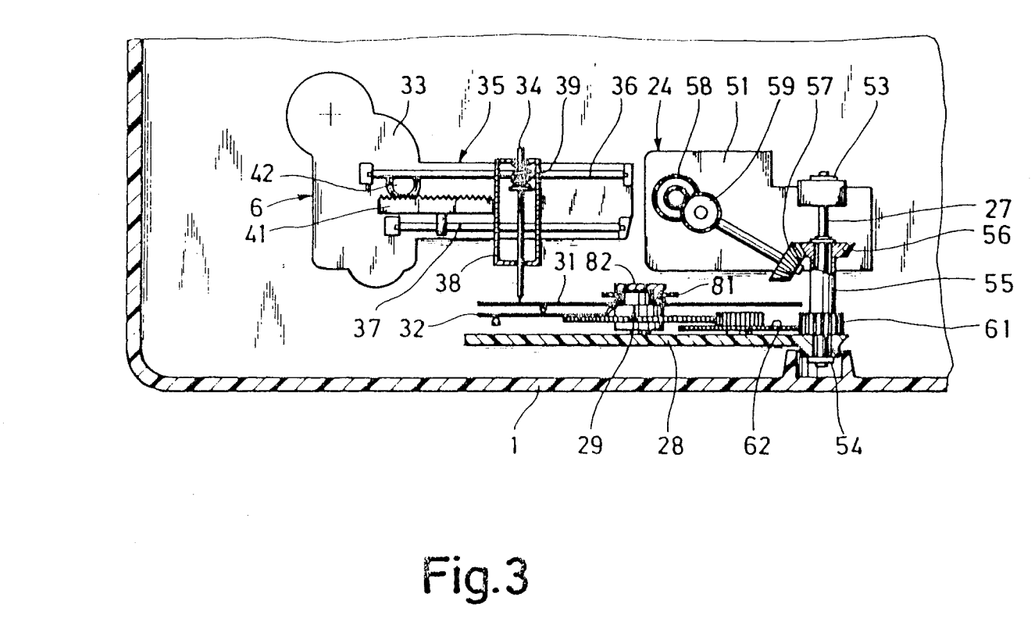
FIG. 3 is a schematic, partly sectional view similar to FIG. 1, but with the instrument dial removed.

Mounted in casing 1 for swivel motion about a swivel pin 27 is a plate 28 on which—see FIG. 3—a rotationally driven diagram chart carrier 29 is arranged. The diagram chart carrier 29 which will be described in detail hereinafter serves, in a manner known per se, to accommodate one or several diagram charts 31, 32 on which the measured values furnished by the instruments in the casing 1 are recorded in a similarly conventional manner. To this end, the measuring instruments comprise recording devices which, in turn, are connected in a known manner to marker pens which inscribe the surface of the diagram charts. In particular, the measuring instruments arranged behind the main instrument dial 4, i.e., the speedometer 6, the total mileage counter 15 and the time switches 11, 12 are provided with such recording devices.

In contrast to known vehicle operation recorders, in the operating position, the diagram chart 31 to be inscribed does not lie behind the main instrument panel 4 and coaxially axially with the speedometer pointer shaft, but in laterally offset relation thereto, as illustrated. Consequently, starting, for example, from the recording device designated in FIG. 3 by reference numeral 33 and associated with the speedometer 6, a functional connection must be established with the associated marker pen 34 necessarily arranged immediately above the diagram chart 31, by means of which the lateral space between the main instrument panel 4 and the diagram chart 31 is bridged. A bridge member 35, illustrated schematically in FIGS. 1, 3 and 4, with sliding guides 36, 37 for a marker pen slide 38 serves this purpose. The marker pen 34 is mounted in the marker pen slide 38 for displacement perpendicularly to the plane of the diagram chart 31 and is pretensioned by a spring 39. A rack 41 protruding from the slide 38 meshes with an output pinion 42 of the recording device 33. The slide 38 and thus the marker pen 34 are, therefore, displaced in accordance with the value measured by the speedometer 6, via the output pinion 42 and the rack 41, to enable the measured value to be recorded on the diagram chart 31.

Figure 4:
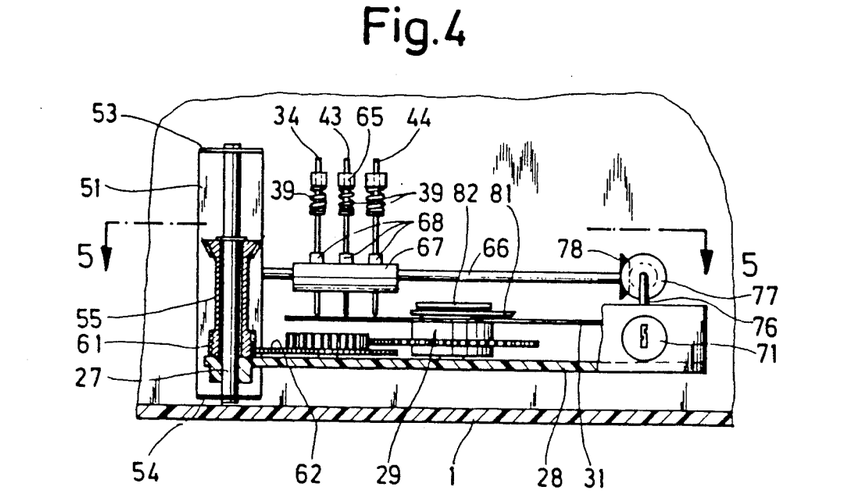
FIG. 4 is a view similar to FIG. 3 of a different embodiment of the vehicle operation recorder with liftable marker pens.

In a corresponding manner, there are arranged on the bridge member 35, further sliding guides and marker pen slides with marker pens for further measured values which are to be recorded, for example, the values of the mileage covered and the respective setting of the time switches 11, 12. The marker pens associated with the mileage covered and the time switches which have been omitted in FIG. 3 for reasons of clarity, are indicated in FIGS. 1 and 4 by reference numerals 43, 44.

In the operating position of the diagram chart, the plate 28 carrying the diagram chart carrier 29 is swivelled into a compartment 47 (FIGS. 1 and 2) of the casing 1 which is similarly laterally offset in relation to the main instrument dial 4. To insert and remove the diagram charts, the plate 28 is swivelled outwardly about the swivel pin 27, as indicated in FIGS. 2 and 4, whereupon the diagram chart can be exchanged in an easy and convenient manner. It is worthy of notice that no measuring instruments or parts of such instruments need be moved along with this outward swivelling of the plate, as was hitherto the case with the tiltable lid casings of known vehicle operation recorders.

In the known vehicle operation recorders with downwardly swingable lid casing, the plane of the diagram chart runs parallel to the plane of the main instrument panel. In the illustrated embodiment, these two planes include an angle of approximately 90 degrees. In principle, it is also possible for this angle to be smaller, for example 45 degrees, so that if the swivel pin 27 is correspondingly arranged, the plate 28 can be swivelled out of the compartment 47 into a position in which it extends, for example, downwardly at an incline, which may further facilitate insertion and removal of the diagram chart.

Instead of swivel design of the plate 28 carrying the diagram chart carrier 29, the plate 28 may, in another embodiment of the invention, be slidingly displaceable in a sliding guide.

Movability of the plate 28 carrying the diagram chart carrier 29 relative to the recording and display devices of the measuring instruments mounted stationarily in the casing and to the main instrument dial 4 may be totally dispensed with if an automatic inserting and ejecting device for the diagram charts is associated with the diagram chart carrier 29. Such an automatic device may, for example, comprise draw-in rollers and a sensing and positioning device for securing the diagram chart in its correct position to the diagram chart carrier. The insertion and ejection slot 48 of such an automatic diagram chart changing device is indicated in dashed lines in FIG. 1.

The clockwork of the clock 24 arranged in laterally offset relation to the main instrument dial 4 comprises—see FIG. 3—a plate 51 with protruding arms 53, 54 in which the swivel pin 27 of the plate 28 carrying the diagram chart carrier is mounted. Seated for rotation on this swivel pin 27 is a sleeve 55 comprising at its upper end in FIG. 3 a bevel gear 56. This bevel gear meshes with a bevel gear 57 which, in turn, is connected by gears to the clockwork of the clock 24, only two gears 58, 59 being indicated in FIG. 3. In this way, the sleeve 55 is driven in time synchronization by the clock 24. The sleeve 55 comprises at its lower end in FIG. 3 a gear 61 which meshes with a gear 62 mounted on the plate 28. Starting from this gear 62, the diagram chart carrier 29 which is likewise mounted on the plate 28 is driven in time synchronization.

As is apparent from the described gear assembly, the plate 28 can be swivelled about the axis 27 without impeding engagement with the clockwork of the clock 24 and the time synchronization of the drive.

Figure 5:
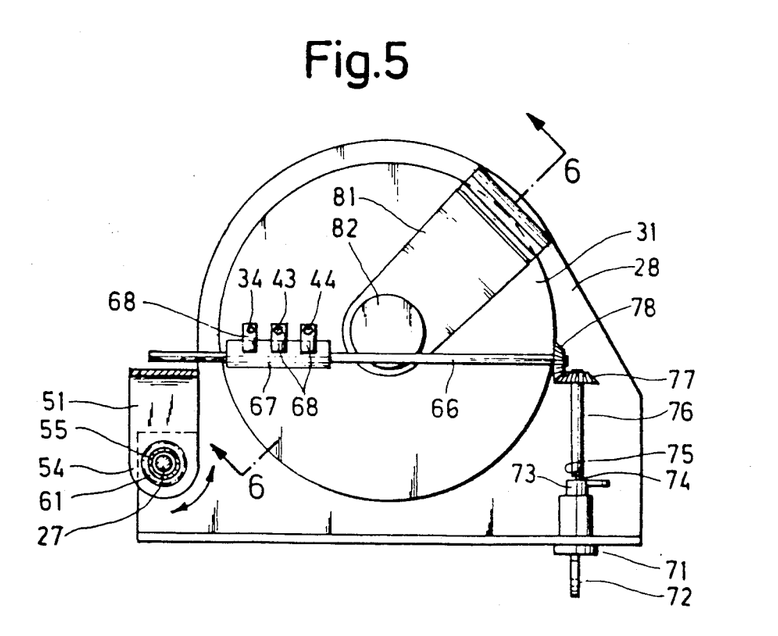
FIG. 5 is a schematic sectional view taken on line 5—5 in FIG. 4.

As illustrated in FIG. 4 in a somewhat modified embodiment of a vehicle operation recorder, the marker pens 34, 43, 44 are displaceably mounted on a slide member 65 and are pretensioned by the spring 39 onto the diagram chart 31. When the plate 28 holding the diagram chart carrier 29 is swivelled about the axis 27, the tips of the marker pens 34, 43, 44 must be lifted off the diagram chart 31 to avoid undesired recording marks on the diagram chart. To this end, there is mounted on a shaft 66 mounted in the casing 1, a relatively elongate, eccentric cam 67 which lifts the marker pens off the diagram chart 31 by means of projections protruding from the marker pens (FIG. 5) when the shaft 66 is rotated, so that the diagram chart 31 can be swivelled out of the compartment 47 together with the plate 28 without undesired recording marks being made on it by the marker pens.

The shaft 66 and thus the cam 67 can be rotated in various ways to lift the marker pens. For example, the rotation could be derived from the swivel motion or translatory motion of the plate 28. If the vehicle operation recorder comprises an automatic inserting and ejecting device for the diagram charts, the shaft 66 can be displaced through the necessary angle simultaneously with the driving of this device in order to lift the marker pens off the diagram chart. In the embodiment illustrated in FIGS. 4 and 5, the lifting motion of the marker pens is derived from a lock 71 with associated key 72. The lock 71 serves to lock a wall section which is connected to the plate 28 and when the compartment 47 is closed can lie approximately in the plane of the front wall of the casing 1 formed by the pane 2. As illustrated schematically, a coupling member 74 fixedly connected to a rotatable lock part 73 positively engages a corresponding slit 75 on the front end of a rotatably mounted shaft 76 once the aforementioned wall section is closed. Thus, the shaft 76 can be rotated by rotational motion of the key 72. The shaft 76 carries a bevel gear 77 which meshes with a bevel gear 78 seated on the shaft 66. Therefore, when the key 72 is turned, the resulting rotation of the shaft 66 through the necessary angle can cause the marker pens 34, 43, 44 to be lifted off the diagram chart 31 and brought back into the inscribing position again.

Figure 6:
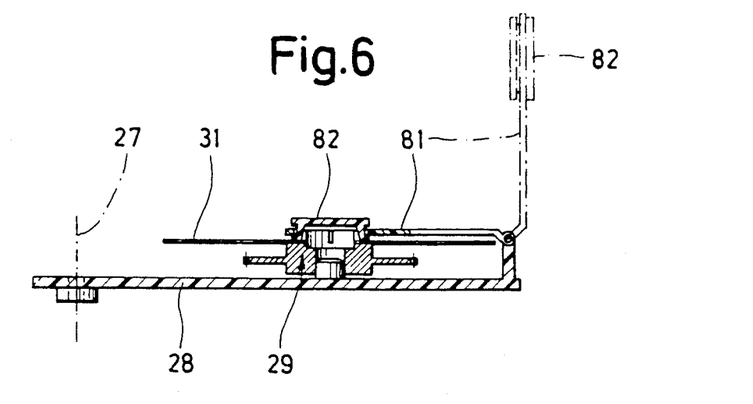
FIG. 6 is a schematic view of a diagram chart carrier with a retaining flap for diagram charts.
Figure 7:
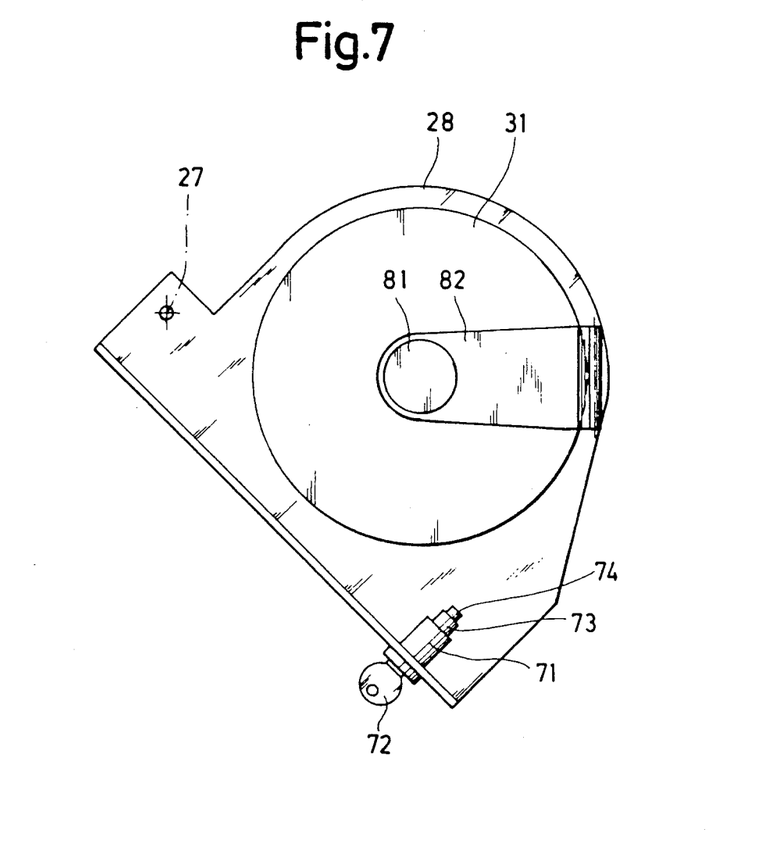
FIG. 7 is a schematic plan view of FIG. 6.

FIGS. 6 and 7 show schematically a simple clamping device with which a diagram chart can be quickly and safely attached to the diagram chart carrier 29 so that the chart rotates together with the carrier. The clamping device comprises a flap 81 mounted for swivel motion on the plate 28 or on the casing 1 of the vehicle operation recorder. At its free end, the flap 81 carrie in a rotatable and axially immovable manner a clamping member 82. If the flap 81 is swivelled downwardly out of its position perpendicular to the plate 28 in FIG. 6, through 90 degrees, the clamping member 82 holds the diagram chart on the diagram chart carrier 29 with sufficient pressure, and the clamping member 82 can rotate in the flap 81 together with the diagram chart 31 during operation of the device.

In a further modified embodiment of the invention, the clock 24 is not arranged stationarily in the casing 1, but is connected to the movable plate 28 so that it can be swivelled out or pushed out of the compartment 47 together with the diagram chart carrier 29. In this embodiment, the dial of the clock may, for example, be arranged on the wall section of the plate 28 which also carries the lock 71, where it is easy to see. The advantage of this embodiment is that the gear assembly between clock 24 and diagram chart carrier 29 operating via swivel pin 27, as described with reference to FIG. 3, can be eliminated since the clock is arranged together with the diagram chart carrier on the movable plate 28 and, therefore, a direct gear connection can be established by simple means between clock and diagram chart carrier.

The rigid bridge member 35 described hereinabove and illustrated in the appended drawings is immovable in the instant embodiment and protrudes in a cantilever manner so far from the associated recording device 33 that the marker pens 34, 43 and 44 reach their operating position above the diagram chart 31. In other embodiments, the rigid bridge member itself can also be movable. For example, the rack 41 (FIG. 3) could itself form the rigid bridge member and be mounted in a cantilever and displaceable manner in a sliding guide on the recording device 33. The marker pen 34 is then attached to the free end of the rack 41 which can be supported at its free end against an abutment arranged on the casing 1. In a similar manner, the rigid bridge whose function it is to bridge the space between recording device 33 and diagram chart 31 may also be a swivel arm carrying a marker pen at its free end.

There is often the regulation that a vehicle operation recorder be sealed in order to prevent unallowed manipulation. This is also realizable in a simple manner in the vehicle operation recorder proposed herein, for example, by jointly accommodating the display and recording devices in a sealable casing block and inserting this block in sealed form in the casing 1.

In the embodiment described hereinabove and illustrated in the appended drawings, the compartment 47 accommodating the diagram chart carrier is laterally offset in relation to the main instrument dial 4. In principle, this compartment 47 may also be positioned behind the main instrument dial 4 and the measuring, display and recording devices covered by it, in which case, in particular, the axis of rotation of the diagram chart carrier 29 can then extend at an angle to the axis of the speedometer pointer 7, and not coaxially therewith.

In the vehicle operation recorder shown in FIGS. 1 to 7, a tiltable lid casing is eliminated, all of the display and recording devices are permanently arranged in an integrated, inseparable casing, and the diagram charts can be conveniently placed onto a diagram chart carrier which is movable out of the casing. This enables flexible design of the display devices and thus of the instrument panel of a motor vehicle.

FIGS. 8 to 12 relate to vehicle operation recorders which are easier to survey and simpler to operate than those of FIGS. 1 to 7. Like parts are designated by the same reference numerals in FIGS. 1 to 7 and 8 to 12.

Figure 8:
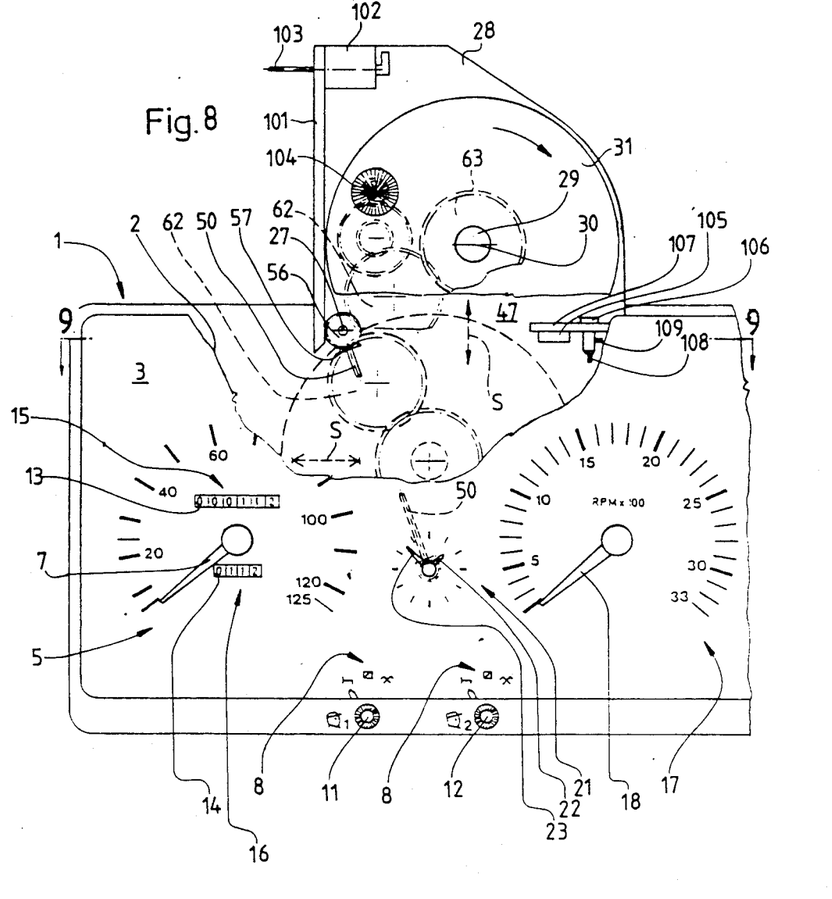
FIG. 8 is a schematic plan view of another embodiment of a vehicle operation recorder, with parts broken away.
Figure 9:
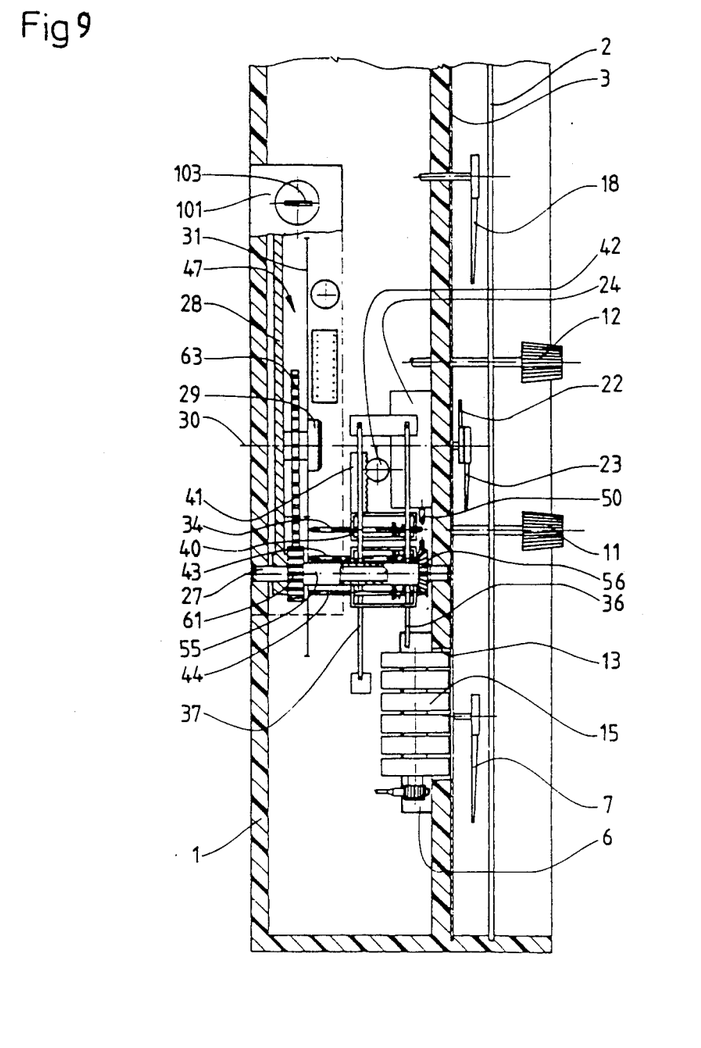
FIG. 9 is a sectional view taken on line 9—9 in FIG. 8.

The vehicle operation recorder illustrated in FIGS. 8 and 9 comprises a substantially block-shaped casing 1 whose cross-sectional shape is apparent from FIG. 9. The casing 1 is covered on its front side by a transparent pane 2 made of glass or plastic. An instrument dial 3 with several scales and pointers moving over them is located behind it. The instrument dial 3 comprises a speedometer scale 5 with a pointer 7 driven by a speedometer 6 (FIG. 9) allocated to it. The instrument dial 3 further comprises symbols 8 (FIG. 8) which are associated with a time switch 11 and 12, respectively. Two drivers of a motor vehicle can alternately set their work times, rest times and the like at these switches in the conventional manner. Finally, the instrument dial 3 comprises slots 13, 14 where the display digits of a total mileage counter 15 and a daily mileage counter 16 are visible in a known manner. The counters are located behind the instrument dial 3 and are permanently fixedly connected to the integral, inseparable casing 1.

The instrument dial 3 further comprises an rpm scale 17 with pointer 18 of a revolution counter (not illustrated) likewise accommodated in the casing 1.

Clock hands 22, 23 are rotatable over a dial 21 of a clock with a clockwork 24. The dial 21 is laterally offset in relation to the speedometer scale 5. The clockwork 24 of the clock is also stationarily mounted in the casing 1.

Mounted for swivel motion about a swivel pin 27 in the casing 1 is a plate 28 with a diagram chart carrier 29 rotationally driven by the clockwork 24 arranged thereon. The diagram chart carrier 29 serves in a manner known per se to accommodate one or several diagram charts, only one diagram chart 31 being shown in the drawings. When the vehicle operation recorder is in operation, the measured values furnished by the instruments in casing 1 are recorded on the diagram charts in a likewise conventional manner. To this end, the instruments comprise recording devices which, in turn, are connected in a known manner to marker pens which inscribe the surface of the diagram chart(s). In particular, the time switches 11, 12 are also provided with such recording devices. A pinion 42 apparent from FIG. 9 is rotated via the time switch 11. The pinion 42 meshes with a rack 41 which is rigidly connected to the casing 40 of a marker pen 34. The marker pen casing 40 is transversely displaceable over the plane of the diagram chart 31 on a guide formed by two rods 36, 37. Thus, when the time switch 11 is turned, the marker pen 34 can be adjusted so as to record on the diagram chart 31 a circular track of a certain radius concentrically with the axis of rotation 30 of the diagram chart 31. Further marker pens 43, 44 are allocated to the speedometer 6 and to the total mileage counter 15 and are in drive connection with these components via corresponding bridge members. The space between the measuring instruments and the diagram chart 31 is bridged by the bridge members, for example, racks corresponding to rack 41, so that the measured values indicated by the instruments are correctly recorded thereon.

In FIG. 8, the linear inscription area within which the marker pens 34, 43 and 44 move is indicated by a double arrow S.

When the vehicle operation recorder is out of operation, swivelling of the plate 28 causes the diagram chart carrier 29 to be swivelled upwardly out of the housing where diagram charts 31 can be conveniently exchanged.

During operation, the diagram chart carrier 29 lies with the diagram chart or charts attached to it in a compartment 47 of the casing 1. In the illustrated embodiment, the swivel axis 27 of the plate 28 runs parallel to the axis of the speedometer pointer 7, i.e., the plate 28 is swivelled in a plane which is substantially parallel to the instrument dial 3 on the front side of the casing 1. Usually, pane 2 and with it casing 1 extend at an incline to the horizontal so that the driver of a motor vehicle has a good view of the instrument dial 3. In this case, the plate 28 can be swivelled upwardly out of the casing 1 in a correspondingly inclined plane. The swivel axis 27 need not run parallel to the axis of rotation of the speedometer pointer 7. Where the casing is arranged at an incline, it is also possible for the plate 28 and the diagram chart 29 to be movable in a substantially vertical plane.

In the illustrated embodiment, the compartment 47 accommodating the diagram chart carrier 29 is located approximately in the center between the scales 5, 17 of the instrument dial 3 and behind the display devices of the measuring instruments associated with these displays. During operation, the diagram chart carrier 29 is, therefore, laterally offset in relation to the speedometer scale 5 and the rpm scale 17. This lateral offset is not absolutely essential. In another embodiment of the invention, the axis of rotation 27 may be so arranged that during operation of the vehicle operation recorder, the diagram chart carrier 29 is located behind the display device 6 of the speedometer without being laterally offset in relation thereto, for example, such that the axis of rotation 30 of the diagram chart carrier 29 extends substantially coaxially with the pointer shaft of pointer 7. This results in a particularly compact, space-saving embodiment wherein the diagram charts 31 can be made easily accessible by the upward outward swivelling of the diagram chart carrier 29 without having to separate the casing by tilting it open. Also, when the diagram chart carrier 29 is moved out of the casing 1, no measuring instruments, parts of such instruments or recording devices need be moved with it, as was hitherto the case with the tiltable lid casings of known vehicle operation recorders.

The diagram chart carrier moves in a plane running parallel to the plane of the diagram chart. However, this is also not absolutely essential; the axis of rotation 30 of the diagram chart and the swivel axis 27 of the plate 28 need not run parallel to each other.

The diagram chart carrier 29 is driven from the clockwork 24 of the clock via a shaft 50. A sleeve 55 is arranged for rotation on the swivel pin 27 of the plate 28 carrying the diagram chart carrier 29. The sleeve 55 comprises at its lower end in FIG. 9 a bevel gear 56. This bevel gear 56 meshes with a bevel gear 57 (FIG. 8) which is driven in time synchronization with the clockwork 24 via the shaft 50. The sleeve further comprises at its upper end in FIG. 9 a gear 61 (FIG. 9) which meshes with a gear 62 (FIG. 8) mounted on the plate 28. Starting from this gear 62, via a further gear 63, the diagram chart carrier 29 which is connected to the gear 63 for rotation therewith is driven in time synchronization. This gear connection enables the plate 28 to be swivelled about the axis 27 without impeding engagement with the clockwork 24 and the time synchronization of the drive. Furthermore, when the plate 28 is swivelled back into the compartment 47, a time misalignment between clock and diagram chart carrier caused by this gear assembly during the outward swivel motion is compensated.

As is apparent from the appended drawings, a cover 101 connected to the plate 28 and protruding perpendicularly therefrom is swivelled together with the plate 28. During operation of the vehicle operation recorder, the cover 101 seals the compartment 47 accommodating the diagram chart carrier 29. Arranged on the cover 101 is a lock 102 with a removable key 103. The lock 102 is designed in a known manner as a snap-in lock so that when the cover 101 is swivelled into the closed position, it snaps in without the key having to be turned and locks the cover. The key 103 need only be inserted into the lock 102 and turned for opening purposes.

There may also be associated with the plate 28 in a manner known per se and, therefore, not separately illustrated, a second detent mechanism which arrests the plate in its upwardly swivelled position outwardly of the casing when the vehicle operation recorder is out of operation, thereby enabling convenient exchange of the diagram charts 31 without having to hold the plate 28.

During closure, the cover 101 covers not only the compartment 47 of the casing 1 accommodating the diagram chart carrier 29 and the diagram charts 31 but, in addition, further functional parts of the vehicle operation recorder. These functional parts include, in particular, an adjustment knob 104 for the clock. The knob 104 indicated schematically in FIG. 8, is mounted on the side of the plate 28 facing away from the diagram chart 31. As is also apparent from FIG. 8, it is connected via a gear arrangement to gear 62 so that the clock can be set when the knob 104 is turned. During closure of the cover 101, the adjustment knob 104 is no longer accessible.

Fixedly arranged on a carrier 107 in the compartment 47, as further functional parts of the vehicle operation recorder, are a coder switch 105 and a socket 106 (as indicated schematically in FIG. 8). Electric leads can be connected to two lugs 108, 109 of the socket 106. As is known per se, by appropriate adjustment of the coder switch 105 which is usually additionally sealed, the correctness of a measurement can be checked or an appropriate calibration can be made at the socket 106.

When the cover 101 is open, the socket 106 is freely accessible. When the cover 101 is closed, the socket 106 and the coder switch 107 are inaccessibly covered.

Figure 10:
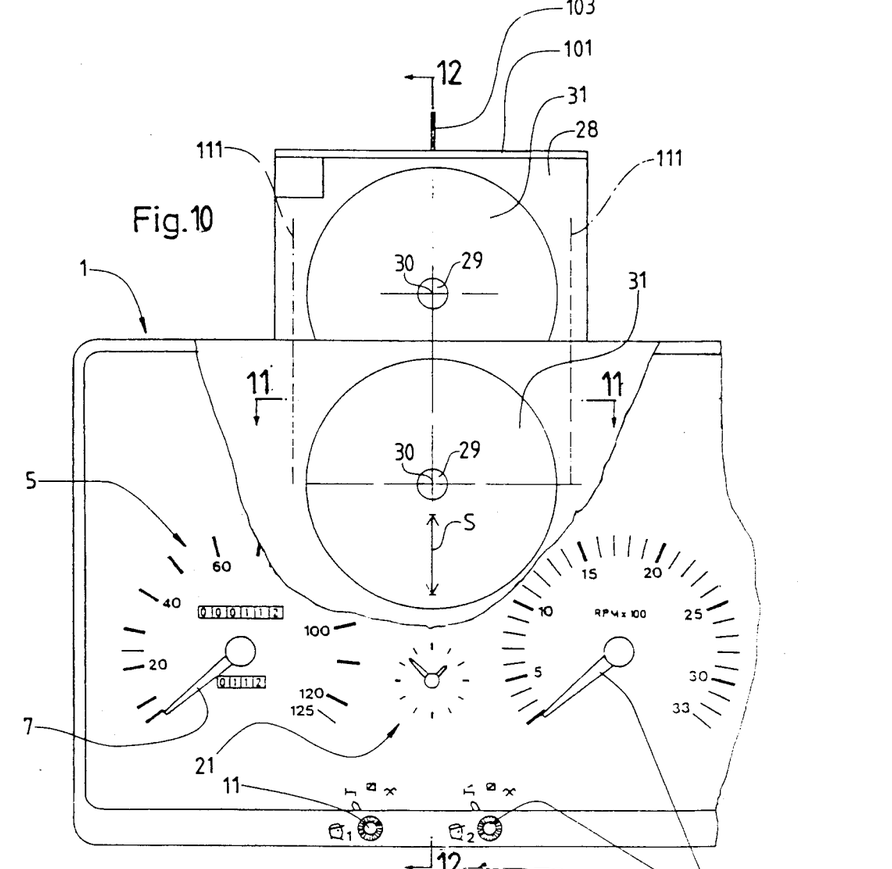
FIG. 10 is a schematic plan view of a further embodiment of a vehicle operation recorder, with parts broken away.
Figure 11:
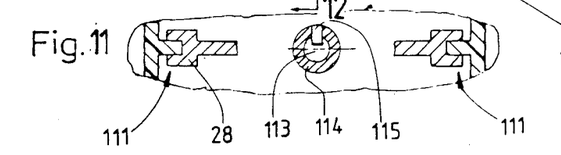
FIG. 11 is an enlarged sectional view taken on line 11—11 in FIG. 10.
Figure 12:
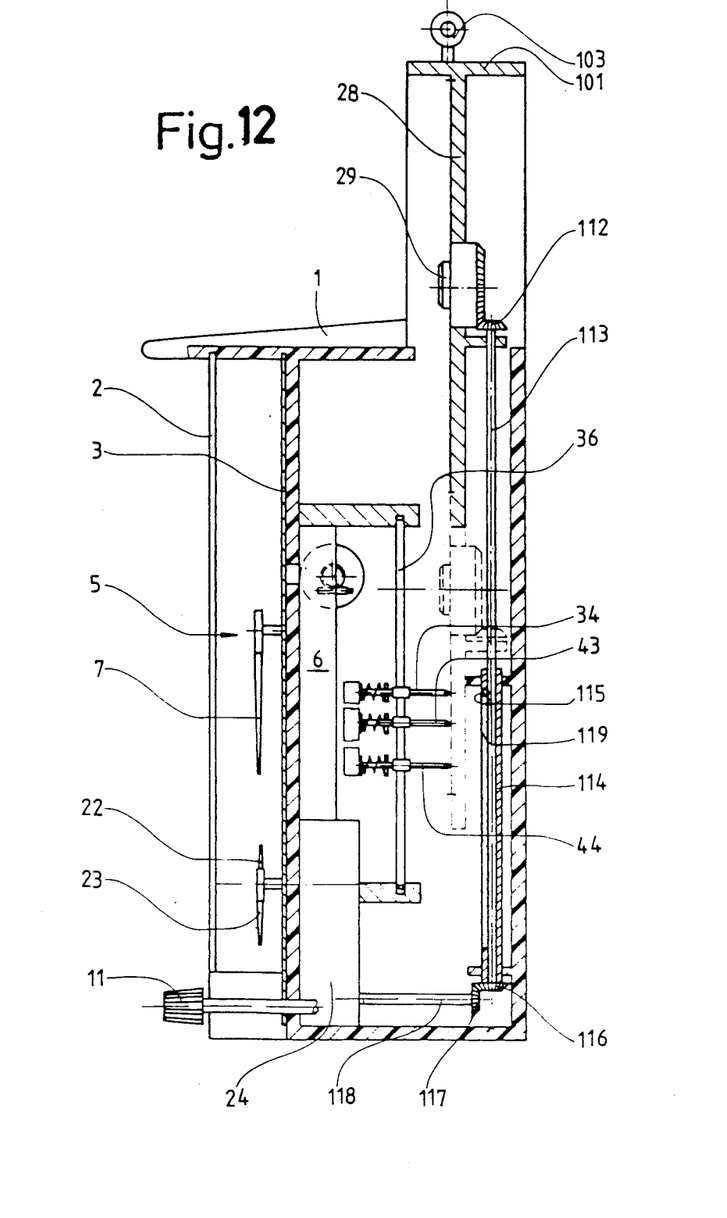
FIG. 12 is a sectional view taken on line 12—12 in FIG. 10.

FIGS. 10 to 12 show an embodiment of a vehicle operation recorder which is a modification of that of FIGS. 8 and 9. Like parts in FIGS. 10 to 12 and 8 and 9 are designated by the same reference numerals.

The main difference between the two embodiments is that the plate 28 carrying the diagram chart carrier 29 and the diagram chart(s), with the cover 101, is not upwardly movable out of casing 1 by swivel motion, but by sliding displacement. To this end, the plate 28 (see FIG. 11) is displaceably mounted on either side in sliding guides 111 whose center lines are indicated by dot-and-dash lines in FIG. 10 and are similarly designated by reference numeral 111. In the embodiment shown in FIGS. 10 to 12, the inscription area S is turned through 90 degrees in relation to the inscription area S in the embodiment of FIGS. 8 and 9 and extends parallel to the direction of displacement of the plate 28 (FIG. 10). Aside from that, all of the statements made in conjunction with the embodiment of FIGS. 8 and 9 also apply to the embodiment of FIGS. 10 to 12. In particular, during operation of the vehicle operation recorder, the diagram chart carrier 29 may also be located directly behind the speedometer scale 5 without being laterally offset in relation thereto.

FIG. 12 shows in solid lines the diagram chart carrier 29 in its upwardly displaced position outwardly of the vehicle operation recorder casing 1. The operating position in which the diagram chart carrier 29 is inserted is shown in dashed lines in FIG. 12.

The following arrangement is provided in order to prevent interruption of the gear connection between the diagram chart carrier 29 and the clockwork 24 when it is pushed out:

A bevel gear 112 driving the diagram chart carrier 29 is connected to a bar 113 for rotation therewith. The bar 113 is guided in a slidingly displaceable manner (telescoping) in a pipe 114 extending parallel to the bar. Protruding laterally from the bar 113 is a pin 115 which extends into an axial slot 119 in the pipe 114. Thus, bar 113 and pipe 114 are connected for rotation with each other, but are slidingly displaceable. When the plate 28 is pulled out of casing 1, bar 113 slides upwardly out of the pipe 114 without losing its rotational connection with this pipe. At the lower end in FIG. 12, the pipe 114 comprises a bevel gear 116 which meshes with a bevel gear 117. The bevel gear 117 is driven by the clockwork 24 via a shaft 118. There is, therefore, a permanent drive connection between the diagram chart carrier 29 and the clockwork 24, even when the diagram chart carrier is pushed out of the casing 1 while the vehicle operation recorder is out of operation.

What is claimed is:

1. Vehicle operation recorder for motor vehicles comprising:
   a casing,
   measuring instruments, including speedometer, mileage counters and clock, arranged in said casing,
   recording devices and display devices included in said measuring instruments,
   marker pens connected to said recording devices,
   at least one main instrument dial allocated to said display devices,
   a diagram chart carrier rotationally driven by said clock for accommodation of at least one diagram chart on which the measured values indicated by said measuring instruments are recorded by said marker pens,
   means acting upon said marker pens for lifting said marker pens off said diagram chart to change said diagram chart, and wherein:
   said recording devices are permanently undetachably connected to said display devices,
   said diagram chart carrier (29) is arranged in a separate compartment of said casing, said compartment being laterally offset in relation to said main instrument dial,
   said marker pens are arranged above said diagram chart in likewise laterally offset relation to said main instrument dial and are connected to said recording devices by a rigid bridge member,
   said diagram chart carrier is movable relative to said recording and display devices of said measuring instruments to change said diagram sheet, said recording and display devices being stationarily arranged in said casing, and
   said clock is also arranged in laterally offset relation to said main instrument dial in fixed relation in said casing, and
   further comprising gear assembly means for permanently connecting said clock to said movable diagram chart carrier.

2. Vehicle operation recorder as defined in claim 1, wherein:
   in the operating position, the plane of said diagram chart is inclined at an angle differing from zero in relation to the plane of said main instrument dial.

3. Vehicle operation recorder as defined in claim 2, wherein:
   the angle of inclination is greater than 45 degrees, preferably approximately 90 degrees.

4. Vehicle operation recorder as defined in claim 1, wherein:
   motion of said diagram chart carrier relative to said recording and display devices automatically triggers the lifting of said marker pens.

5. Vehicle operation recorder as defined in claim 1, further comprising:
   an automatic insertion and ejection device for said diagram chart associated with said diagram chart carrier; and
   wherein action of said insertion and ejection device triggers lifting of said marker pens.

6. Vehicle operation recorder as defined in claim 1, wherein:
   said marker pens are liftable by actuation of a lock which locks the compartment.

7. Vehicle operation recorder as defined in claim 1, further comprising:
   a flap adapted to clamp said diagram chart on said diagram chart carrier.

8. Vehicle operation recorder as defined in claim 1, wherein:
   said diagram chart carrier is arranged on a plate which is slidingly displaceable relative to said casing.

9. Vehicle operation recorder as defined in claim 1, wherein:
   said diagram chart carrier is arranged on a plate mounted for rotation on said casing, said plate being swivable into and out of said compartment.

10. Vehicle operation recorder as defined in claim 1, wherein:

said diagram chart carrier is pivotably mounted within said casing.

11. Vehicle operation recorder as defined in claim 1, wherein:
said display and recording devices are combined in a sealable casing block which is insertable into said casing.

12. Vehicle operation recorder as defined in claim 1, wherein:
during operation of said vehicle operation recorder, said compartment and said diagram chart carrier are spatially arranged behind said display device and an associated pointer, and said diagram chart carrier is upwardly movable out of said casing.

13. Vehicle operation recorder as defined in claim 1, characterized in that:
motion of said diagram chart carrier (29) relative to said recording and display devices (33, 34, 4, 7) automatically triggers the lifting of said marker pens (34, 43, 44).

14. Vehicle operation recorder as defined in claim 1, characterized in that:
actuation of said insertion and ejection device (48) triggers the lifting of said marker pens (34, 43, 44).

15. Vehicle operation recorder as defined in claim 10, wherein:
said diagram chart carrier pivots about a pin, and
said gear assembly means comprises a sleeve surrounding said pin, a gear mounted to said sleeve and meshed in driving relation with said diagram chart carrier, a first bevel gear mounted to said sleeve, a second bevel gear meshed with said first bevel gear, and means for driving said second bevel gear from said clock.

16. Vehicle operation recorder as defined in claim 12, wherein:
said diagram chart carrier is mounted in said casing for swivel motion about an axis and can be swivelled upwardly out of said casing while said display and recording devices remain stationary.

17. Vehicle operation recorder as defined in claim 12, wherein:
said diagram chart carrier is mounted for sliding displacement in said casing and can be pushed upwardly out of said casing while said display and recording devices remain stationary.

18. Vehicle operation recorder as defined in claim 12, wherein:
said diagram chart carrier is movable in a substantially vertical plane.

19. Vehicle operation recorder as defined in claim 12, wherein:
during operation of said vehicle operation recorder, the axis of rotation of said diagram chart carrier extends approximately coaxially with a pointer shaft of said display device.

20. Vehicle operation recorder as defined in claim 12, further comprising:
a cover adapted to lock said compartment accommodating said diagram chart carrier.

21. Vehicle operation recorder as defined in claim 12, wherein:
said display devices with instrument dial and associated pointers and also said recording devices with marker pens are accommodated by said casing, said casing being stationary and inseparable.

22. Vehicle operation recorder as defined in claim 12, wherein:
said diagram chart carrier is upwardly movable out of said casing in a plane parallel to the plane of said diagram chart.

23. Vehicle operation recorder as defined in claim 16, wherein:
said gear assembly means includes a gear coaxial with the swivel axis.

24. Vehicle operation recorder as defined in claim 17, wherein:
said gear assembly means includes telescopically connected parts which rotate with one another.

25. Vehicle operation recorder as defined in claim 20, wherein:
said cover is fixedly arranged on said plate carrying said diagram chart carrier.

26. Vehicle operation recorder as defined in claim 20, wherein:
said cover simultaneously covers further functional parts of said vehicle operation recorder, including an adjustment knob for said clock.

27. Vehicle operation recorder as defined in claim 26, wherein:
said adjustment knob for said clock is arranged on said plate holding said diagram chart carrier.

28. Vehicle operation recorder as defined in claim 26, wherein:
said further functional parts include a coder switch and a socket.

* * * * *